US010797553B2

(12) United States Patent
Tsuruta et al.

(10) Patent No.: US 10,797,553 B2
(45) Date of Patent: Oct. 6, 2020

(54) PERMANENT MAGNET ELECTRIC MOTOR

(71) Applicant: FUJITSU GENERAL LIMITED, Kanagawa (JP)

(72) Inventors: Tetsuya Tsuruta, Kanagawa (JP); Masanori Murakami, Kanagawa (JP); Shingo Suzuki, Kanagawa (JP)

(73) Assignee: FUJITSU GENERAL LIMITED, Kanagawa (JP)

( * ) Notice: Subject to any disclaimer, the term of this patent is extended or adjusted under 35 U.S.C. 154(b) by 0 days.

(21) Appl. No.: 16/312,661

(22) PCT Filed: Sep. 21, 2017

(86) PCT No.: PCT/JP2017/034108
§ 371 (c)(1),
(2) Date: Dec. 21, 2018

(87) PCT Pub. No.: WO2018/056359
PCT Pub. Date: Mar. 29, 2018

(65) Prior Publication Data
US 2019/0214875 A1    Jul. 11, 2019

(30) Foreign Application Priority Data

Sep. 21, 2016  (JP) ................... 2016-184391

(51) Int. Cl.
*H02K 1/30* (2006.01)
*H02K 5/08* (2006.01)
(Continued)

(52) U.S. Cl.
CPC ............. *H02K 5/08* (2013.01); *H02K 1/28* (2013.01); *H02K 1/30* (2013.01); *H02K 5/1732* (2013.01);
(Continued)

(58) Field of Classification Search
CPC . H02K 5/08; H02K 1/28; H02K 11/01; H02K 11/0094; H02K 11/044; H02K 5/1732; H02K 1/30; H02K 1/27–1/2793
(Continued)

(56) References Cited

U.S. PATENT DOCUMENTS

| 8,987,955 B2* | 3/2015 | Mizukami ............. H02K 11/40 310/72 |
| 2011/0043071 A1 | 2/2011 | Mizukami et al. |
| 2014/0015363 A1 | 1/2014 | Kowa et al. |

FOREIGN PATENT DOCUMENTS

| CN | 201623555 U | 11/2010 |
| CN | 102611226 A | 7/2012 |

(Continued)

OTHER PUBLICATIONS

Dec. 26, 2017, International Search Report issued for related PCT application No. PCT/JP2017/034108.
(Continued)

*Primary Examiner* — Thomas Truong
(74) *Attorney, Agent, or Firm* — Paratus Law Group, PLLC

(57) ABSTRACT

The rotor includes an annular permanent magnet, an annular first iron core situated on the inner diameter side of the magnet, an annular second iron core situated on the inner diameter side of the first iron core, an insulating member situated between the first iron core and the second iron core, and a shaft provided along a central axis of the second iron core, the first iron core is provided with a plurality of outer periphery side convex portions protruding from an inner periphery toward the inner diameter side, the second iron core is provided with a plurality of inner periphery side convex portions protruding from an outer periphery toward the outer diameter side, and the outer periphery side convex portions and the inner periphery side convex portions are disposed in positions not overlapping each other when viewed in the radial direction from the axis of the second iron core.

4 Claims, 6 Drawing Sheets

(51) Int. Cl.
*H02K 5/173* (2006.01)
*H02K 11/04* (2016.01)
*H02K 11/00* (2016.01)
*H02K 11/01* (2016.01)
*H02K 1/28* (2006.01)

(52) U.S. Cl.
CPC ......... *H02K 11/0094* (2013.01); *H02K 11/01* (2016.01); *H02K 11/044* (2013.01)

(58) Field of Classification Search
USPC .......... 310/156.01–156.84, 216.001–216.137
See application file for complete search history.

(56) References Cited

FOREIGN PATENT DOCUMENTS

| CN | 103545949 A | 1/2014 | | |
|---|---|---|---|---|
| CN | 203800717 U | 8/2014 | | |
| CN | 204030755 U | 12/2014 | | |
| CN | 104505963 A | 4/2015 | | |
| CN | 204538838 U | 8/2015 | | |
| EP | 2975743 A1 | 1/2016 | | |
| JP | 2001-268831 A | 9/2001 | | |
| JP | 2012-039875 A | 2/2012 | | |
| JP | 2015-106966 A | 6/2015 | | |
| WO | WO 2011/141958 A1 | 11/2011 | | |
| WO | WO-2011141958 A1 | * | 11/2011 | ............. H02K 11/40 |
| WO | WO 2015/196604 A1 | 12/2015 | | |
| WO | WO 2017/098907 A1 | 6/2017 | | |

OTHER PUBLICATIONS

Dec. 26, 2017, International Search Opinion issued for related PCT application No. PCT/JP2017/034108.

Dec. 19, 2017, Japanese Office Action issued for related JP application No. 2016-184391.

Apr. 2, 2020, European Search Report issued for related EP Application No. 17853128.1.

Jul. 21, 2020, Chinese Office Action issued for related CN application No. 201780039052.1.

* cited by examiner

A-A' CROSS SECTION

PERMANENT MAGNET ELECTRIC MOTOR

CROSS REFERENCE TO PRIOR APPLICATION

This application is a National Stage Patent Application of PCT International Patent Application No. PCT/JP2017/034108 (filed on Sep. 21, 2017) under 35 U.S.C. § 371, which claims priority to Japanese Patent Application No. 2016-184391 (filed on Sep. 21, 2016), which are all hereby incorporated by reference in their entirety.

TECHNICAL FIELD

The present invention relates to a permanent magnet electric motor provided with a rotor having an insulating member.

BACKGROUND ART

As a conventional permanent magnet electric motor, a permanent magnet electric motor of an inner rotor type is known in which a rotor having a permanent magnet is rotatably disposed inside a stator that generates a rotating magnetic field. This permanent magnet electric motor is used, for example, for rotating a blower fan mounted on an air conditioner.

When this permanent magnet electric motor is driven by a PWM inverter that performs high-frequency switching, a potential difference (axial voltage) occurs between the inner ring and the outer ring of the bearing, and when this axial voltage reaches the breakdown voltage of the oil film inside the bearing, current flows inside the bearing to cause electrolytic corrosion inside the bearing. To prevent this electrolytic corrosion of the bearing, for example, a permanent magnet electric motor provided with a rotor having an insulating member is known. This rotor is provided with, for example, an annular permanent magnet, an annular outer periphery side iron core situated on the inner diameter side of the permanent magnet, an annular inner periphery side iron core situated on the inner diameter side of the outer periphery side iron core, an insulating member situated between the outer periphery side iron core and the inner periphery side iron core, and a shaft fixed to a through hole passing through in a direction along the central axis of the inner periphery side iron core.

The insulating member of the rotor like this is formed of, for example, a resin filled between the outer periphery side iron core and the inner periphery side iron core. Moreover, a plurality of convex portions are formed on each of the outer periphery side iron core and the inner periphery side iron core of the rotor. The plurality of convex portions protrude from the inner peripheral surface of the outer periphery side iron core toward the inner diameter side and protrude from the outer peripheral surface of the inner periphery side iron core toward the outer diameter side, respectively, for rotation locking of the outer periphery side iron core and the inner periphery side iron core with the insulating member (for example, see Patent Document 1). Further, in the rotor described in Patent Document 1, the convex portions formed on the outer periphery side iron core and the inner periphery side iron core are disposed in positions overlapping each other when viewed in the radial direction from the central axis of the inner periphery side iron core.

PRIOR ART DOCUMENT

Patent Document

Patent Document 1: JP-A-2012-39875

SUMMARY OF THE INVENTION

Problem that the Invention is to Solve

Regarding the above-mentioned electrolytic corrosion of the bearing, when the permanent magnet electric motor is driven by a PWM inverter, the neutral point potential of the winding of the stator does not become zero, so that a voltage called common mode voltage is caused. This common mode voltage in which a high-frequency component due to switching is contained causes an axial voltage between the outer ring and the inner ring of the bearing by the stray capacitance distribution inside the permanent magnet electric motor.

The common mode voltage is divided as the potential on the inner ring side (the shaft side) of the bearing by the electrostatic capacity distribution between the winding of the stator and the shaft and the electrostatic capacity distribution between the shaft and the inverter driving circuit board. And the common mode voltage is divided as the potential on the outer ring side (the bracket side) of the bearing by the electrostatic capacity distribution between the winding of the stator and the bracket and the electrostatic distribution between the bracket and the inverter driving circuit board. The potential difference between the inner ring side and the outer ring side of this bearing is the axial voltage.

To suppress the axial voltage like this, it is necessary that the potential on the inner ring side (the shaft side) of the bearing and the potential on the outer ring side (the bracket side) of the bearing be balanced with each other, and in the rotor described in Patent Document 1, an insulating member is filled between the outer periphery side iron core and the inner periphery side iron core to reduce the electrostatic capacity between the outer periphery side iron core and the inner periphery side iron core (part of the electrostatic capacity distribution between the winding of the stator and the shaft) to reduce the potential on the inner ring side of the bearing, thereby making the potentials on the inner ring side and the outer ring side coincide with each other.

However, in the structure in which the convex portions formed on the outer periphery side iron core and the inner periphery side iron core are disposed in positions overlapping each other when viewed in the radial direction from the central axis of the inner periphery side iron core and an insulating member is filled between the convex portions like the rotor described in Patent Document 1, the distance between the convex portions is short. The electrostatic capacity between the outer periphery side iron core and the inner periphery side iron core of the rotor is dependent on the distance between the convex portions, and when the distance between the convex portions is decreased, the electrostatic capacity between the outer periphery side iron core and the inner periphery side iron core is increased. When the electrostatic capacity between the outer periphery side iron core and the inner periphery side iron core is increased, the potential on the inner ring side is increased and this makes it impossible to suppress the axial voltage, which can results in the occurrence of electrolytic corrosion of the bearing.

In view of the above-mentioned problem, an object of the present invention is to provide a permanent magnet electric motor capable of preventing electrolytic corrosion of the bearing while securing the function of rotation locking of the outer periphery side iron core and the inner periphery side iron core of the rotor with the insulating member.

Means for Solving the Problem

To solve the above-mentioned problem, a permanent magnet electric motor of the present invention is provided with a stator and a rotor disposed inside the stator, the rotor is provided with: an annular permanent magnet; an annular outer periphery side iron core situated on the inner diameter side of the permanent magnet; an annular inner periphery side iron core situated on the inner diameter side of the outer periphery side iron core; an insulating member situated between the outer periphery side iron core and the inner periphery side iron core; and a shaft provided along the central axis of the inner periphery side iron core. The permanent magnet electric motor is characterized in that the outer periphery side iron core is provided with a plurality of outer periphery side convex portions protruding from the inner periphery toward the inner diameter side, that the inner periphery side iron core is provided with a plurality of inner periphery side convex portions protruding from the outer periphery toward the outer diameter side, and that the outer periphery side convex portions and the inner periphery side convex portions are disposed in positions not overlapping each other when viewed in the radial direction from the central axis of the inner periphery side iron core.

Advantage of the Invention

According to the permanent magnet electric motor of the present invention, electrolytic corrosion of the bearing can be prevented while securing the function of rotation locking of the outer periphery side iron core and the inner periphery side iron core of the rotor with the insulating member.

MODE FOR CARRYING OUT THE INVENTION

<General Structure of Motor>

Figure 1:
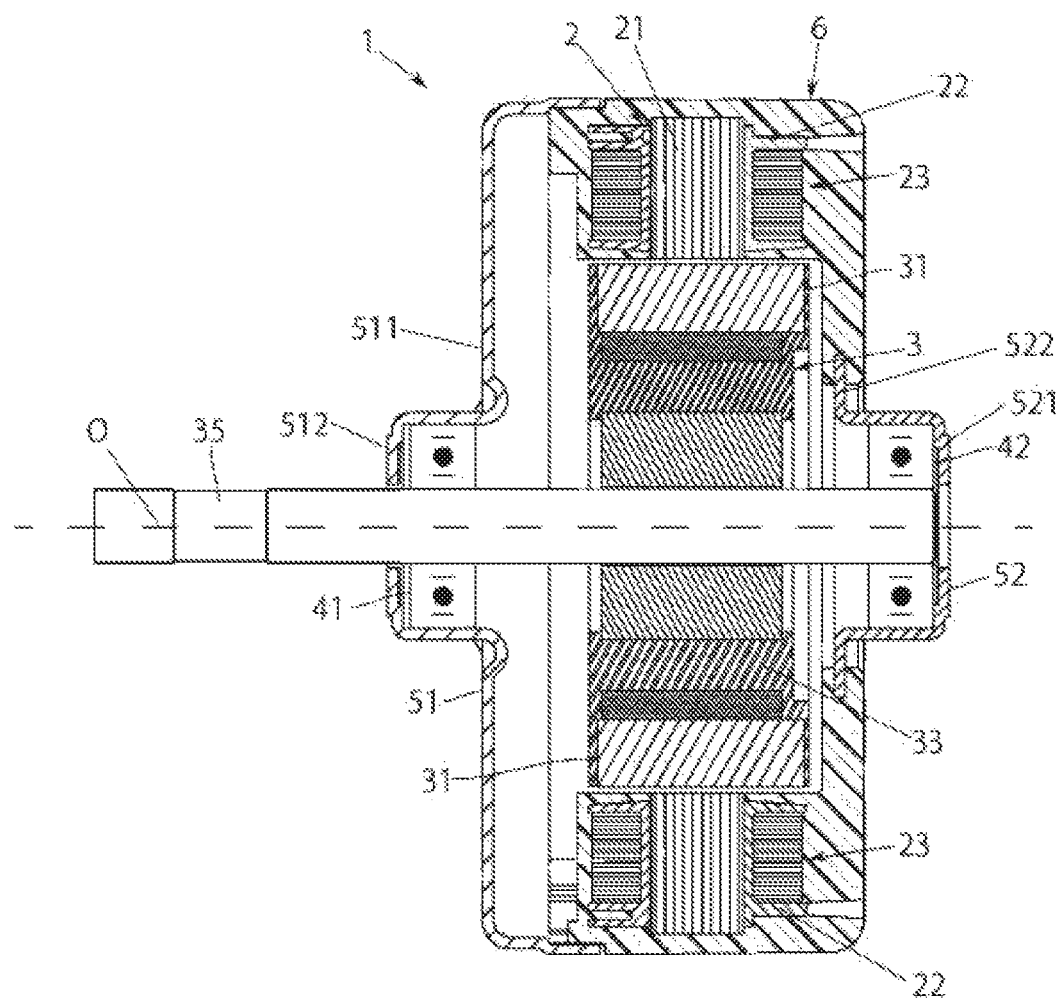
FIG. 1 An explanatory view showing a permanent magnet electric motor according to the present invention.

Hereinafter, embodiments of the present invention will be described in detail based on the attached drawings. FIG. 1 to FIG. 5 are views explaining the structure of a permanent magnet electric motor 1 in the present embodiment. As shown in FIG. 1 to FIG. 5, this permanent magnet electric motor 1 is, for example, a brushless DC motor, and used for rotating the blower fan mounted on the indoor equipment of an air conditioner. Hereinafter, the permanent magnet electric motor 1 of an inner rotor type in which a rotor 3 having a permanent magnet 31 is rotatably disposed inside a stator 2 generating a rotating magnetic field will be described as an example. The permanent magnet electric motor 1 in the present embodiment is provided with the stator 2, the rotor 3, a first bearing 41, a second bearing 42, a first bracket 51 and a second bracket 52.

<Stator and Rotor>

The stator 2 is provided with a stator iron core 21 having a cylindrical yoke portion and a plurality of teeth portions extending from the yoke portion toward the inner diameter side, and a winding 23 is wound on the teeth portions through an insulator 22. This stator 2 is covered with a motor outer shell 6 made of a resin except for the inner periphery of the stator iron core 21. The rotor 3 has the annular permanent magnet 31 and a shaft 35, and the permanent magnet 31 is integrally disposed around the shaft 35 through an outer periphery side iron core 32, an insulating member 33 and an inner periphery side iron core 34 described later. This rotor 3 is rotatably disposed with a predetermined void (gap) on the inner periphery side of the stator iron core 21 of the stator 2.

<Bearings and Brackets>

The first bearing 41 supports one end side (the output side) of the shaft 35 of the rotor 3. The second bearing 42 supports the other end side (the side opposite to the output side) of the shaft 35 of the rotor 3. As the first bearing 41 and the second bearing 42, for example, ball bearings are used.

The first bracket 51 is made of a metal (a steel sheet, aluminum, etc.), and is fixed to the motor outer shell 6 on the one end side of the shaft 35 of the rotor 3. The first bracket 51 has a cylindrical bracket body portion 511 having a bottom surface and a first bearing accommodating portion 512 provided on the bottom surface for accommodating the first bearing 41. The bracket body portion 511 of the first bracket 51 is press-fitted to the outer periphery of the motor outer shell 6. The first bearing accommodating portion 512 of the first bracket 51 is formed in a cylindrical shape having a bottom surface and has a hole at the center of the bottom surface, and the one end side of the shaft 35 protrudes from this hole.

The second bracket 52 is made of a metal (a steel sheet, aluminum, etc.), and is disposed on the motor outer shell 6 on the other end side of the shaft 35 of the rotor 3. The second bracket 52 has a second bearing accommodating portion 521 for accommodating the second bearing 42 and a flange portion 522 spreading around the second bearing accommodating portion 521. The second bearing accommodating portion 521 of the second bracket 52 is formed in a cylindrical shape having a bottom surface, and the flange portion 522 of the second bracket 52 is partly covered with a resin and is integral with the motor outer shell 6.

The first bearing 41 is accommodated in the first bearing accommodating portion 512 provided on the first bracket 51, the second bearing 42 is accommodated in the second bearing accommodating portion 521 provided on the second bracket 52, and the first bearing 41 and the first bearing accommodating portion 512, and the second bearing 42 and the second bearing accommodating portion 521 are electrically conducted with each other.

<Concrete Structure of Rotor>
<First Embodiment of Rotor>

Figure 2A:
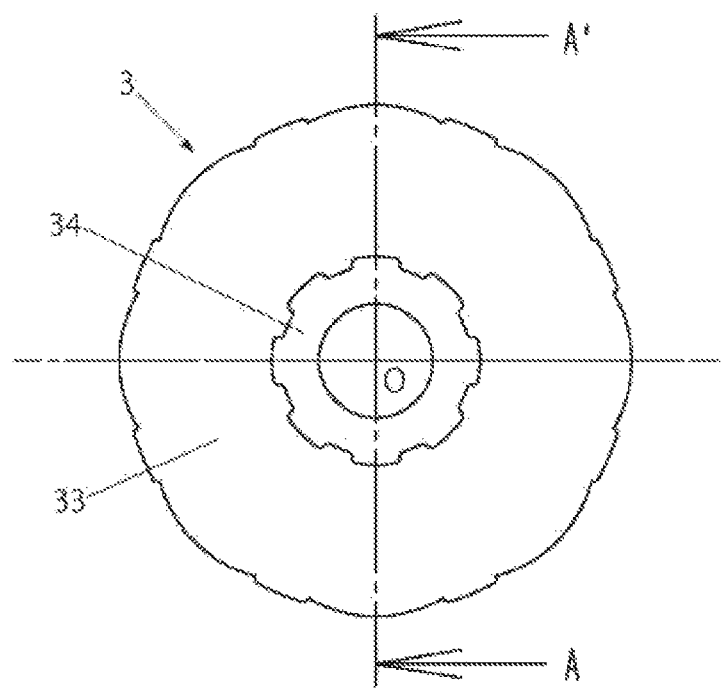
FIG. 2A A plan view showing a rotor of the permanent magnet electric motor according to the present invention.
Figure 2B:
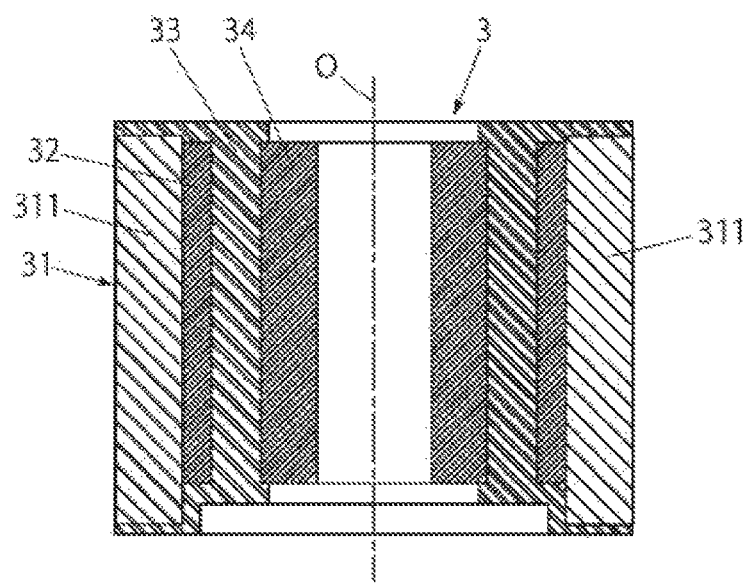
FIG. 2B An A-A' cross-sectional view of FIG. 2A.
Figure 3:
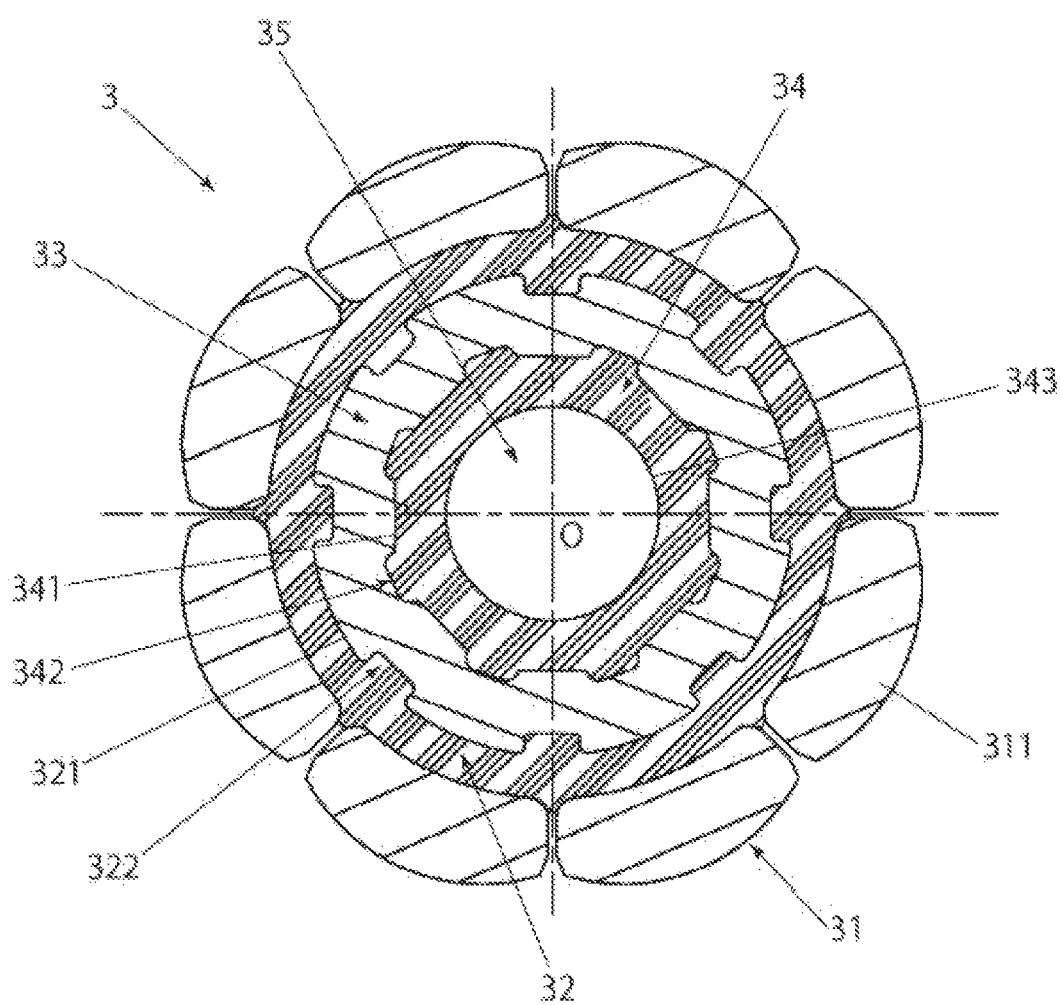
FIG. 3 A transverse cross-sectional view showing the rotor of the permanent magnet electric motor according to the present invention.

In the permanent magnet electric motor 1 structured as described above, in order to prevent electrolytic corrosion from occurring on the first bearing 41 and the second bearing 42, as shown in FIG. 1, the insulating member 33 is provided on part of the rotor 3. Hereinafter, a first embodiment of the rotor 3 will be described. As shown in FIG. 1 to FIG. 3, the rotor 3 is provided with, from the outer diameter side toward the inner diameter side, the permanent magnet 31, the outer periphery side iron core 32, the insulating member 33, the inner periphery side iron core 34 and the shaft 35.

The permanent magnet 31 is formed in an annular shape, and a plurality of (for example, eight) permanent magnet pieces 311 are arranged so that the N-pole and the S-pole alternately appear at regular intervals in the circumferential direction. As the permanent magnet 31, a plastic magnet formed in an annular shape by solidifying magnet powder by a resin may be used. The outer periphery side iron core 32 is formed in an annular shape, and situated on the inner diameter side of the permanent magnet 31. The outer periphery side iron core 32 is provided with, in order to secure the function of rotation locking with the insulating member 33 described later, a plurality of (for example, eight) outer periphery side convex portions 322 protruding from an inner periphery 321 toward the inner diameter side. The plurality of outer periphery side convex portions 322 extend in a direction along the central axis O and are arranged at regular intervals in the circumferential direction.

The inner periphery side iron core 34 is formed in an annular shape, and situated on the inner diameter side of the outer periphery side iron core 32. The inner periphery side iron core 34 is provided with, for securing the function of rotation locking with the insulating member 33 described later, a plurality of (for example, eight) inner periphery side convex portions 342 protruding from an outer periphery 341 toward the outer diameter side and a through hole 343 passing through in the direction along the central axis O at the center. The plurality of inner periphery side convex portions 342 extend in the direction along the central axis O and are arranged at regular intervals in the circumferential direction. The insulating member 33 is made of a dielectric resin such as PBT or PET, and situated between the outer periphery side iron core 32 and the inner periphery side iron core 34. The insulating member 33 is molded integrally with the outer periphery side iron core 32 and the inner periphery side iron core 34 by the resin being filled between the outer periphery side iron core 32 and the inner periphery side iron core 34, and the electrostatic capacity between the outer periphery side iron core 32 and the inner periphery side iron core 34 (part of the electrostatic capacity distribution between the winding 23 of the stator 2 and the shaft 35) is reduced to reduce the potential on the inner ring side of the first bearing 41 and the second bearing 42, thereby making the potentials on the inner ring side and the outer ring side coincide with each other. The shaft 35 is fastened to the through hole 343 provided in the inner periphery side iron core 34 by press fitting or swaging.

<Structure, Workings and Advantage of Rotor Related to Present Invention>

Next, in the permanent magnet electric motor 1 in the present embodiment, using FIG. 2A, FIG. 2B and FIG. 3, the structure, workings and advantage of the rotor 3 related to the present invention will be described. In the above-described structure of the rotor 3, when the outer periphery side convex portions 322 of the outer periphery side iron core 32 and the inner periphery side convex portions 342 of the inner periphery side iron core 34 are disposed in positions overlapping each other when viewed in the radial direction from the central axis O of the inner periphery side iron core 34 as in the rotor described in Patent Document 1 described in the section of Background Art, the following problems arise:

In the permanent magnet electric motor 1 used for rotating the blower fan mounted on an air conditioner, since it is driven by a PWM inverter, the neutral point potential of the winding does not become zero, so that a voltage called common mode voltage is caused. Due to this common mode voltage, a potential difference (axial voltage) is caused between the outer rings and the inner rings of the first bearing 41 and the second bearing 42 by the stray capacitance distribution inside the permanent magnet electric motor 1. When this axial voltage reaches the breakdown voltage of the oil film inside the bearing, current flows inside the bearing to cause electrolytic corrosion inside the bearing.

The rotor 3 has a structure in which the insulating member 33 is filled between the outer periphery side iron core 32 and the inner periphery side iron core 34 to reduce the electrostatic capacity between the outer periphery side iron core 32 and the inner periphery side iron core 34, and the distance between the outer periphery side iron core 32 and the inner periphery side iron core 34 is short between the outer periphery side convex portions 322 and the inner periphery side convex portions 342 compared with at the remaining part. The electrostatic capacity between the outer periphery side iron core 32 and the inner periphery side iron core 34 like this is dependent on the distance between the outer periphery side convex portions 322 and the inner periphery side convex portions 342, and if the distance between the outer periphery side convex portions 322 and the inner periphery side convex portions 342 is decreased, the electrostatic capacity at that part is increased, so that the electrostatic capacity between the outer periphery side iron core 32 and the inner periphery side iron core 34 is increased as a whole.

When the electrostatic capacity between the outer periphery side iron core 32 and the inner periphery side iron core 34 is increased, the axial voltage is increased, which can results in the occurrence of electrolytic corrosion on the first bearing 41 and the second bearing 42. For this reason, it is necessary to prevent electrolytic corrosion from occurring on the first bearing 41 and the second bearing 42 while securing the function of rotation locking of the outer periphery side iron core 32 and the inner periphery side iron core 34 of the rotor 3 with the insulating member 33.

Accordingly, in the rotor 3 in the present invention, the outer periphery side convex portions 322 of the outer periphery side iron core 32 and the inner periphery side convex portions 342 of the inner periphery side iron core 34 are disposed in positions not overlapping each other when viewed in the radial direction from the central axis O of the inner periphery side iron core 34. As a consequence, the distance between the outer periphery side iron core 32 and the inner periphery side iron core 34 is large between the outer periphery side convex portions 322 of the outer periphery side iron core 32 and the inner periphery side convex portions 342 of the inner periphery side iron core 34 compared with when the outer periphery side convex portions 322 and the inner periphery side convex portions 342 are disposed in positions overlapping each other when viewed in the radial direction from the central axis O of the inner periphery side iron core 34. Consequently, the electrostatic capacity between the outer periphery side iron core 32 and the inner periphery side iron core 34 can be made small compared with when the outer periphery side convex portions 322 and the inner periphery side convex portions 342 are disposed in positions overlapping each other when viewed in the radial direction from the central axis O of the inner periphery side iron core 34. As a consequence, the axial voltage can be suppressed by reducing the potential on the inner ring side to make the potentials on the inner ring side and the outer ring side coincide with each other, so that electrolytic corrosion can be prevented from occurring on the first bearing 41 and the second bearing 42.

Showing the measurement results of the electrostatic capacity between the outer periphery side iron core 32 and the inner periphery side iron core 34, the following results were obtained: When the outer periphery side convex portions 322 of the outer periphery side iron core 32 and the inner periphery side convex portions 342 of the inner periphery side iron core 34 were disposed in positions not overlapping each other when viewed in the radial direction from the central axis O of the inner periphery side iron core 34, the electrostatic capacity was 17.51 pF, and when they were disposed in positions overlapping each other when viewed in the radial direction from the central axis O of the inner periphery side iron core 34, the electrostatic capacity was 17.93 pF. The electrostatic capacity between the outer periphery side iron core 32 and the inner periphery side iron core 34 was smaller when the outer periphery side convex portions 322 of the outer periphery side iron core 32 and the inner periphery side convex portions 342 of the inner periphery side iron core 34 were disposed in positions not overlapping each other when viewed in the radial direction from the central axis O of the inner periphery side iron core 34 than when they were disposed in positions overlapping each other when viewed in the radial direction from the central axis O of the inner periphery side iron core 34.

Since the insulating member 33 is filled between the outer periphery side iron core 32 and the inner periphery side iron core 34 along the shapes of the outer periphery side convex portions 322 of the outer periphery side iron core 32 and the inner periphery side convex portions 342 of the inner periphery side iron core 34, the function of rotation locking of the outer periphery side iron core 32 and the inner periphery side iron core 34 with the insulating member 33 can be secured.

<Second Embodiment of Rotor>

Next, using FIG. 4, a second embodiment of the rotor 3 in the present invention will be described. Differences from the above-described embodiment which lie in the structure of the outer periphery side iron core 32 and the inner periphery side iron core 34 are that outer periphery side concave portions 323 are formed on the outer periphery side convex portions 322 of the outer periphery side iron core 32 and that inner periphery side second concave portions 345 are formed on the inner periphery side iron core 34. Regarding the structure of the rotor 3 other than this, since it is the same as that of the above-described embodiment, the same reference numerals and signs are assigned and a detailed description is omitted. Moreover, in the following description, while the outer periphery side concave portions 323 and the inner periphery side second concave portions 345 are formed in the second embodiment, the present invention is not limited thereto; a structure may be adopted in which either the outer periphery side concave portions 323 or the inner periphery side second concave portions 345 are formed.

Figure 4:
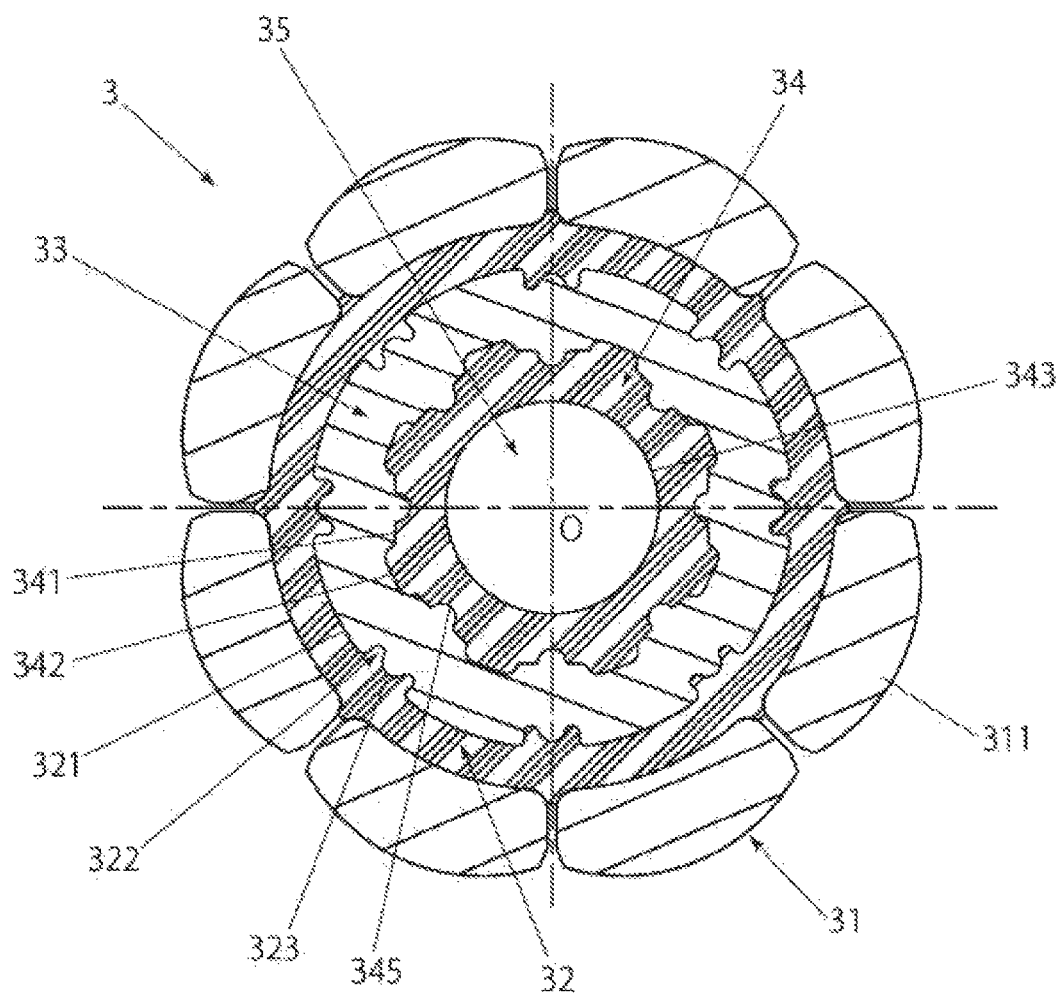
FIG. 4 A transverse cross-sectional view showing a second embodiment of the rotor of the permanent magnet electric motor according to the present invention.

First, in the rotor 3, as shown in FIG. 4, on the outer periphery side convex portions 322 of the outer periphery side iron core 32, the outer periphery side concave portions 323 that are concave from the end side thereof toward the outer diameter side are formed. The outer periphery side concave portions 323 pass through in the direction along the central axis O in parallel with the shaft 35, and the cross section vertical to the shaft 35 is formed in an arc shape. By forming these outer periphery side concave portions 323 on the outer periphery side convex portions 322, consideration is given so that the flow of the magnetic flux passing the outer periphery side iron core 32 is not hindered. As a consequence, when the outer periphery side concave portions 323 are formed on the outer periphery side convex portions 322 of the outer periphery side iron core 32 corresponding to the parts where the distance between the outer periphery side iron core 32 and the inner periphery side iron core 34 is short, the following workings and advantage are obtained: Regarding the outer periphery side convex portions 322 of the outer periphery side iron core 32, taking a look at the parts of the outer periphery side concave portions 323, since the distance from the inner periphery side iron core 34 with the insulating member 33 in between is increased compared with when no outer periphery side concave portions 323 are formed as shown in FIG. 3, the radial thickness of the insulating member 33 is increased. Therefore, by adjusting the distance between the outer periphery side convex portions 322 and the inner periphery side iron core 34, the electrostatic capacity between the outer periphery side iron core 32 and the inner periphery side iron core 34 can be adjusted, so that the electrolytic corrosion of the first bearing 41 and the second bearing 42 can be prevented.

Further, by forming in an arc shape the outer periphery side concave portions 323 formed on the outer periphery side convex portions 322 of the outer periphery side iron core 32, the outer periphery side concave portions 323 are made concave portions serving also as the parts where positioning pins provided on a metal mold used at the time of the assembly of the rotor 3 are fitted. As a consequence, when the outer periphery side iron core 32 and the inner periphery side iron core 34 are disposed inside the metal mold, the outer periphery side concave portions 323 can be utilized for positioning when the outer periphery side convex portions 322 of the outer periphery side iron core 32 and the inner periphery side convex portions 342 of the inner periphery side iron core 34 are disposed in positions not overlapping each other when viewed in the radial direction from the central axis O of the inner periphery side iron core 34.

Moreover, in the rotor 3, as shown in FIG. 4, the inner periphery side second concave portions 345 that are concave from the outer periphery 341 toward the inner diameter side are formed on the inner periphery side iron core 34. The inner periphery side second concave portions 345 are disposed in positions overlapping the outer periphery side concave portions 323 of the outer periphery side convex portions 322 when viewed in the radial direction from the central axis O of the inner periphery side iron core 34. The inner periphery side second concave portions 345 pass through in the direction along the central axis O in parallel with the shaft 35, and the cross section vertical to the shaft 35 is formed in an arc shape. As a consequence, when the inner periphery side second concave portions 345 are formed in positions corresponding to the parts where the distance between the outer periphery side iron core 32 and the inner periphery side iron core 34 is short which positions overlap the outer periphery side concave portions 323 of the outer periphery side convex portions 322 when viewed in the radial direction from the central axis O of the inner periphery side iron core 34, the following workings and advantage are obtained: Regarding the inner periphery side iron core 34, taking a look at the parts of the inner periphery side second concave portions 345, the distance from the outer periphery side convex portions 322 of the outer periphery side iron core 32 with the insulating member 33 in between is further increased compared with when only the outer periphery side concave portions 323 are formed on the outer periphery side convex portions 322 of the outer periphery side iron core 32, so that the radial thickness of the insulating member 33 is further increased. Therefore, by adjusting the distance between the outer periphery side convex portions 322 and the inner periphery side iron core 34, the electrostatic capacity between the outer periphery side iron core 32 and the inner periphery side iron core 34 can be adjusted, so that the electrolytic corrosion of the first bearing 41 and the second bearing 42 can be prevented.

Further, by forming the inner periphery side second concave portions 345 of the inner periphery side iron core 34 in an arc shape, like the outer periphery side concave portions 323, the inner periphery side second concave portions 345 are made concave portions serving also as the parts where positioning pins provided on a metal mold used at the time of the assembly of the rotor 3 are fitted. As a consequence, when the outer periphery side iron core 32 and the inner periphery side iron core 34 are disposed in the metal mold, the inner periphery side second concave portions 345 can be utilized for positioning when the outer periphery side convex portions 322 of the outer periphery side iron core 32 and the inner periphery side convex portions 342 of the inner periphery side iron core 34 are disposed in positions not overlapping each other when viewed in the radial direction from the central axis O of the inner periphery side iron core 34.

<Third Embodiment of Rotor>

Next, using FIG. 5, a third embodiment of the rotor 3 in the present embodiment will be described. A difference from the above-described second embodiment which lies in the structure of the inner periphery side iron core 34 is that no inner periphery side second concave portions 345 are formed on the inner periphery side iron core 34 unlike in the above-described second embodiment and inner periphery side first concave portions 344 are formed on the inner periphery side convex portions 342 of the inner periphery side iron core 34. Regarding the structure of the rotor 3 other than this, since it is the same as that of the above-described embodiments, the same reference numerals and signs are assigned and a detailed description is omitted.

Figure 5:
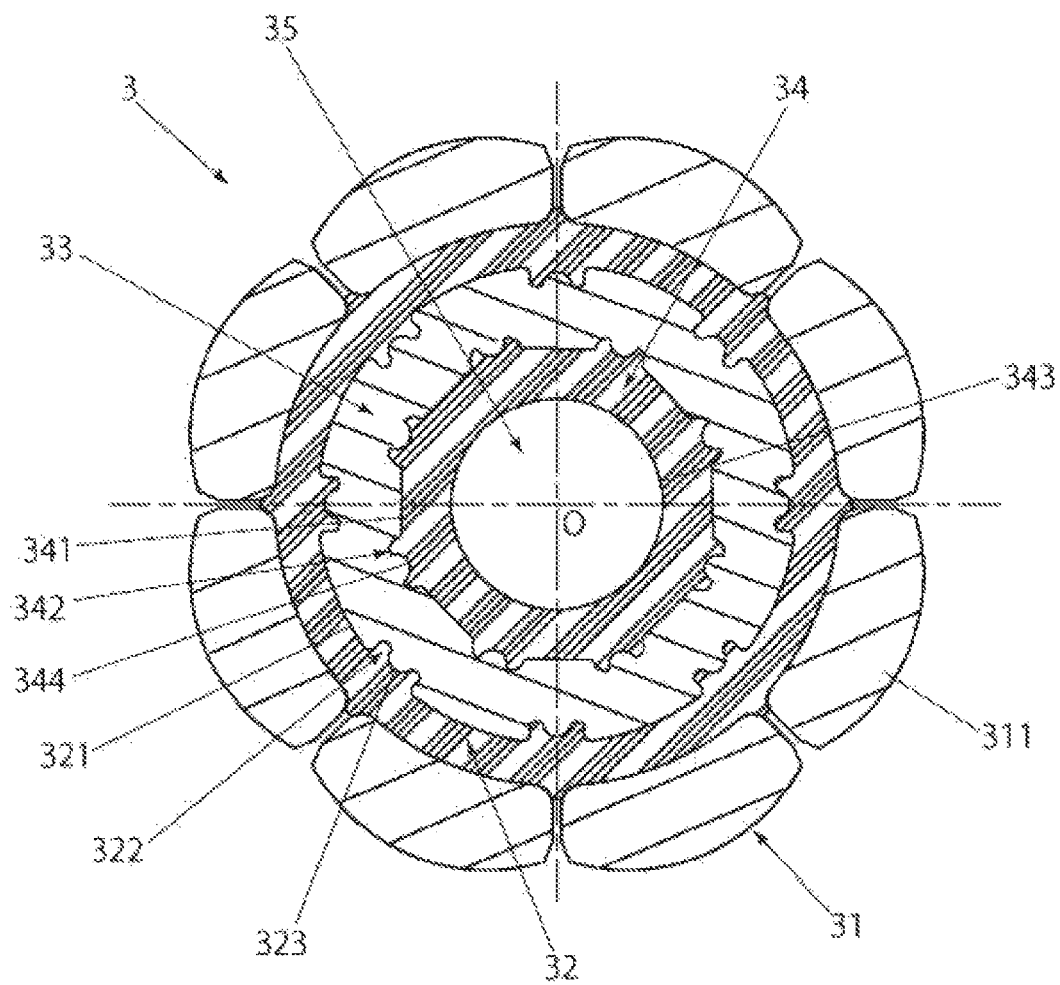
FIG. 5 A transverse cross-sectional view showing a third embodiment of the rotor of the permanent magnet electric motor according to the present invention.

In the rotor 3, as shown in FIG. 5, on the inner periphery side convex portions 342 of the inner periphery side iron core 34, the inner periphery side first concave portions 344 that are concave from the end side thereof toward the inner diameter side are formed. The inner periphery side first concave portions 344 pass through in the direction along the central axis O in parallel with the shaft 35, and the cross section vertical to the shaft 35 is formed in an arc shape. As a consequence, when the inner periphery side first concave portions 344 are formed on the inner periphery side convex portions 342 of the inner periphery side iron core 34 corresponding to the parts where the distance between the outer periphery side iron core 32 and the inner periphery side iron core 34 is short, the following workings and advantage are obtained: Regarding the inner periphery side convex portions 342 of the inner periphery side iron core 34, taking a look at the parts of the inner periphery side first concave portions 344, the distance from the outer periphery side iron core 32 with the insulating member 33 in between is increased compared with when no inner periphery side first concave portions 344 are formed as shown in FIG. 3, so that the radial thickness of the insulating member 33 is increased. Therefore, as in the above-described second embodiment, by adjusting the distance between the outer periphery side iron core 32 and the inner periphery side convex portions 342, the electrostatic capacity between the outer periphery side iron core 32 and the inner periphery side iron core 34 can be adjusted, so that the electrolytic corrosion of the first bearing 41 and the second bearing 42 can be prevented.

Further, by forming in an arc shape the inner periphery side first concave portions 344 formed on the inner periphery side convex portions 342 of the inner periphery side iron core 34, the inner periphery side first concave portions 344 are made concave portions serving also as the parts where positioning pins provided on a metal mold used at the time of the assembly of the rotor 3 are fitted. As a consequence, as in the above-described second embodiment, when the outer periphery side iron core 32 and the inner periphery side iron core 34 are disposed in the metal mold, the inner periphery side first concave portions 344 can be utilized for positioning when the outer periphery side convex portions 322 of the outer periphery side iron core 32 and the inner periphery side convex portions 342 of the inner periphery side iron core 34 are disposed in positions not overlapping each other when viewed in the radial direction from the central axis O of the inner periphery side iron core 34.

While the outer periphery side concave portions 323 formed on the outer periphery side convex portions 322 of the outer periphery side iron core 32 are formed in an arc shape in the rotor 3 according to the second embodiment and the third embodiment, the present invention is not limited thereto; they may be formed in a rectangular shape. Moreover, while the inner periphery side second concave portions 345 formed on the outer periphery 341 of the inner periphery side iron core 34 are formed in an arc shape in the rotor 3 according to the second embodiment, the present invention is not limited thereto; they may be formed in a rectangular shape. Moreover, while the inner periphery side first concave portions 344 formed on the inner periphery side convex portions 342 of the inner periphery side iron core 34 are formed in an arc shape in the rotor 3 according to the third embodiment, the present invention is not limited thereto; they may be formed in a rectangular shape.

While the present invention has been described in detail and with reference to specific embodiments, it is obvious to one of ordinary skill in the art that various changes and modifications may be added without departing from the spirit and scope of the present invention.

DESCRIPTION OF REFERENCE NUMERALS AND SIGNS

1 Permanent magnet electric motor
2 Stator
21 Stator iron core
22 Insulator
23 Winding
3 Rotor
31 Permanent magnet
311 Permanent magnet piece
32 Outer periphery side iron core
321 Inner periphery
322 Outer periphery side convex portion
323 Outer periphery side concave portion
33 Insulating member
34 Inner periphery side iron core
341 Outer periphery
342 Inner periphery side convex portion
343 Through hole
344 Inner periphery side first concave portion
345 Inner periphery side second concave portion
35 Shaft 41 First bearing
42 Second bearing
51 First bracket
511 Bracket body portion
512 First bearing accommodating portion
52 Second bracket
521 Second bearing accommodating portion
522 Flange portion
6 Motor outer shell
O Central axis

The invention claimed is:

1. A permanent magnet electric motor comprising a stator and a rotor disposed inside the stator, the rotor being provided with: an annular permanent magnet; an annular outer periphery side iron core situated on an inner diameter side of the permanent magnet; an annular inner periphery side iron core situated on an inner diameter side of the outer periphery side iron core; an insulating member situated between the outer periphery side iron core and the inner periphery side iron core; and a shaft provided along a central axis of the inner periphery side iron core, characterized in that the outer periphery side iron core is provided with a plurality of outer periphery side convex portions protruding from an inner periphery toward the inner diameter side, that the inner periphery side iron core is provided with a plurality of inner periphery side convex portions protruding from an outer periphery toward an outer diameter side, that the outer periphery side convex portions and the inner periphery side convex portions are disposed in positions not overlapping each other when viewed in a radial direction from the central axis of the inner periphery side iron core, and that on the outer periphery side convex portions, outer periphery side concave portions that are concave toward an outer diameter side are formed.

2. The permanent magnet electric motor according to claim 1, characterized in that on the inner periphery side iron core, inner periphery side second convex portions are formed that are disposed in positions overlapping with the outer periphery side convex portions when viewed in the radial direction from the central axis of the inner periphery side iron core and are concave from the outer periphery toward the inner diameter side.

3. A permanent magnet electric motor comprising a stator and a rotor disposed inside the stator, the rotor being provided with: an annular permanent magnet; an annular outer periphery side iron core situated on an inner diameter side of the permanent magnet; an annular inner periphery side iron core situated on an inner diameter side of the outer periphery side iron core; an insulating member situated between the outer periphery side iron core and the inner periphery side iron core; and a shaft provided along a central axis of the inner periphery side iron core, characterized in that the outer periphery side iron core is provided with a plurality of outer periphery side convex portions protruding from an inner periphery toward the inner diameter side, that the inner periphery side iron core is provided with a plurality of inner periphery side convex portions protruding from an outer periphery toward an outer diameter side, that the outer periphery side convex portions and the inner periphery side convex portions are disposed in positions not overlapping each other when viewed in a radial direction from the central axis of the inner periphery side iron core, and that on the inner periphery side convex portions, inner periphery side first concave portions that are concave toward an inner diameter side are formed.

4. A permanent magnet electric motor comprising a stator and a rotor disposed inside the stator, the rotor being provided with: an annular permanent magnet; an annular outer periphery side iron core situated on an inner diameter side of the permanent magnet; an annular inner periphery side iron core situated on an inner diameter side of the outer periphery side iron core; an insulating member situated between the outer periphery side iron core and the inner periphery side iron core; and a shaft provided along a central axis of the inner periphery side iron core, characterized in that the outer periphery side iron core is provided with a plurality of outer periphery side convex portions protruding from an inner periphery toward the inner diameter side, that the inner periphery side iron core is provided with a plurality of inner periphery side convex portions protruding from an outer periphery toward an outer diameter side, that the outer periphery side convex portions and the inner periphery side convex portions are disposed in positions not overlapping each other when viewed in a radial direction from the central axis of the inner periphery side iron core, and that on the inner periphery side iron core, inner periphery side second convex portions are formed that are disposed in positions overlapping with the outer periphery side convex portions when viewed in the radial direction from the central axis of the inner periphery side iron core and are concave from the outer periphery toward the inner diameter side.

* * * * *